US008234525B2

(12) United States Patent
Dattathrani (10) Patent No.: US 8,234,525 B2
(45) Date of Patent: Jul. 31, 2012

(54) METHOD AND SYSTEM FOR ANOMALY DETECTION IN SOFTWARE PROGRAMS WITH REDUCED FALSE NEGATIVES

(75) Inventor: Sai Dattathrani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 12/437,755

(22) Filed: May 8, 2009

(65) Prior Publication Data

US 2010/0287537 A1   Nov. 11, 2010

(51) Int. Cl.
    *G06F 11/00* (2006.01)
(52) U.S. Cl. .................................. 714/38.1
(58) Field of Classification Search .......... 714/35, 714/38.1, 38.14, 26, 49; 717/124, 127, 128, 717/130
    See application file for complete search history.

(56) References Cited

U.S. PATENT DOCUMENTS

| | | | |
|---|---|---|---|
| 6,966,051 B2 | 11/2005 | McBrearty et al. | |
| 7,089,536 B2 | 8/2006 | Ueki et al. | |
| 7,873,947 B1 * | 1/2011 | Lakhotia et al. | 717/126 |
| 2004/0054535 A1 * | 3/2004 | Mackie et al. | 704/260 |
| 2004/0078784 A1 | 4/2004 | Bates et al. | |
| 2004/0117350 A1 | 6/2004 | Cavage et al. | |
| 2005/0071814 A1 | 3/2005 | Aguilar et al. | |
| 2006/0107121 A1 * | 5/2006 | Mendrala et al. | 714/38 |
| 2006/0161508 A1 * | 7/2006 | Duffie et al. | 706/55 |
| 2006/0282708 A1 * | 12/2006 | Jiang et al. | 714/38 |
| 2007/0234294 A1 | 10/2007 | Gooding | |

OTHER PUBLICATIONS

Abramson, et al., "Implementation Techniques for a Parallel Relative Debugger", International Conference on Parallel Architectures and Compilation Techniques—PACT '96, Oct. 20-23, 1996, Boston Massachusetts, USA.

* cited by examiner

*Primary Examiner* — Robert Beausoliel, Jr.
*Assistant Examiner* — Joseph Kudirka
(74) *Attorney, Agent, or Firm* — Scully, Scott, Murphy & Presser, P.C.; Daniel McLoughlin, Esq.

(57) ABSTRACT

A method, system and article of manufacture are disclosed for detecting anomalies in a software program. The method comprises the steps of running the software program as a client; and the software program sending to a server a multitude of tokens at specified points in the program, each of the tokens having information about the software program. The server implements code to analyze said tokens and to compare information in the tokens to stored data to identify anomalies in the software program. In a preferred embodiment, the tokens identify patterns of operation of the software programs, and the implementing step includes the step of comparing these program patterns with stored acceptable patterns to identify anomalous program patterns. This comparing may be done by the logging, as potential anomalies, selected ones of the program patterns that do not match any of the stored acceptable patterns.

20 Claims, 8 Drawing Sheets

CLIENT SERVER ARCHITECTURE FOR RECORDING INFORMATION

FIG. 1

Pseudo Algorithm

///////////////////// CLIENT CODE /////////////////////////////////////////

```
// Log is the function called from the code
Log(char *LogString)
{
    //Write data to buffer
    Writebuf.put(LogString);
    Signal Write thread to write to socket
    return;
}
class Write2Srvr extends Thread {
    Write2Srvr()
    {
      Writebuf = ByteBuffer.allocate(10240);
        Long int[10] DeadLock;
    } public void run() {

// reads from send buffer & writes to socket
          WaitOnSignal();
          String Log - Writebuf.get();
            s.send(Log);
            }
        }
    }
class ReadFrmSrvr extends Thread {
    ReadFrmSrvr()
    {
    Rdbuf - ByteBuffer.allocate(10);
    } public void run () {
        // reads from the socket & puts in the buffer
        s.receive(Rdbuf);
    }
}
InitializeSocket()
{
    //create a UDP socket
        DatagramSocket S - new DatagramSocket();
    //create a thread to write data to server
    Write2Srvr WrtThrd -new Write2Srvr();
    WrtThrd. start();

//create a thread to read data from server
    ReadFrmSrvr RdThrd - new ReadFrmSrvr(143);
    RdThrd. start();
}
```

FIG. 2

////////////// SERVER CODE //////////////////

MapTok()
{
    //Extract token from the log string
    // Use this token as the key to get an element from the map
}

PatternMatch()
{
    //Pattern is stored as a concatenation of unique token strings
    //When the token indicates it's a pattern matching token, it has to be concatenated &

// stored in a temporary string, which can be matched with stored string patterns
    //We need to have a token to indicate beginning of a pattern and end of a pattern
    If (End of pattern reached)

If (the currently received pattern string does not match stored patterns
          && the start and end state of the pattern is not in the set of acceptable state pairs)
          LOG the pattern
}

ChkRange()
{
    //The key for the map is the token received from the code
    // The map stores the valid range for each of the check range token
    // Use the log token to get the element from the map
      // The element will have the valid range for the token
      // Compare the valid range with the value received from the code
      // If within acceptable range, do not log, else log it
}

ProcessLog(Rdbuf)
{
    // Pick up the packet from the Rdbuf
    // Pick the token type and related details from the Hashtable
    MapTok();
    // Construct the static string i.e. other additional information that needs to be logged For Eg:
Source file name, line number etc. This can be imagined to be the format string
    // Process the message based on type of token - token type is stored in the map
    switch(TokTyp)
    {
        case InitClnup:
        PatternMatch();
               break;
        case VarRange:
               ChkRange();
               break;
    }
}

FIG. 3

```
class Write2Clnt extends Thread {
    Write2Srvr()
    {
        Writebuf - ByteBuffer.allocate(10);
    } public void run() {
        // reads from send buffer & writes to socket
        String Log - Writebuf.get();

s.send(Log);
    }
}
class ReadFrmClnt extends Thread {
    ReadFrmSrvr()
    {
        Rdbuf - ByteBuffer.allocate(2048);
    } public void run() {
        // reads from the socket & processes it
        s.receive(packet);
            //Store the packet in the Rdbuf
            ProcessLog(Rdbuf);
    }
}

InitializeSocket()
{
    //create a UDP socket
        DatagramSocket s - new DatagramSocket();
    //create a thread to write data to server
    Write2Clnt WrtThrd = new Write2Clnt();
    WrtThrd. start();

//create a thread to read data from server
    ReadFrmClnt RdThrd = new ReadFrmClnt(143);
    RdThrd. start();
}
```

METHOD AND SYSTEM FOR ANOMALY DETECTION IN SOFTWARE PROGRAMS WITH REDUCED FALSE NEGATIVES

BACKGROUND OF THE INVENTION

1. Field of the Invention

This invention generally relates to data processing, and more specifically, to methods and systems for detecting anomalies, or debugging, software programs. Even more specifically, the preferred embodiment of the present invention relates to such methods and systems that are very well suited for debugging multithreaded software programs.

2. Background Art

Multithreaded computing programs are a special class of computer software programs comprised of a large number of threads of execution. Typically, each thread of computing environment executes on a dedicated processor such that the threads execute in parallel on a number of processors to solve a common problem.

Multithreaded programs are difficult to design and hence are error prone. Debugging multithreaded programs can be very difficult. Difficulties arise because of the non-determinacy of these programs—the programs are sensitive to the environment, load, thread time slicing, etc. Owing to this, a problem is left that is not easily re-creatable, and neither is it possible to collect all the debugging information needed to solve the problem.

Current debugging programs do not provide adequate means of debugging programs. For instance, there are tools like iWatcher which are hardware dependent, and are also meant purely for memory related bugs. There also are tools for anomaly detection like DIDUCE and DAIKON which are not hardware dependent, but suffer from a high number of false positives. DIDUCE and DAIKON automatically detect the invariants in the program, and monitor the anomaly in these invariants.

SUMMARY OF THE INVENTION

An object of this invention is to provide a method and system for detecting anomalies in software programs.

Another object of the present invention is to collect efficiently debug information from a software program using a technique that is not hardware dependent and that has reduced false negatives.

A further object of the invention is to compare a pattern of behavior of a software program with known good patterns to identify anomalies in the software program.

These and other objectives are attained with a method, system and article of manufacture for detecting anomalies in a software program. The method comprises the steps of running the software program as a client; and the software program sending to a server a multitude of tokens at specified points in the program, each of the tokens having information about the software program. The server implements code to analyze said tokens and to compare information in the tokens to stored data to identify anomalies in the software program.

In a preferred embodiment, the tokens identify patterns of operation of the software programs, and the implementing step includes the step of the server comparing these program patterns with stored acceptable patterns to identify anomalous program patterns. More specifically, this comparing may be done by the server logging, as potential anomalies, selected ones of the program patterns that do not match any of the stored acceptable patterns. The server also includes information identifying acceptable end states for the program patterns; and the comparing step may include the further step of logging, as actual anomalies, any of the selected ones of the program patterns that reach an end state that is not one of the acceptable end states.

In the preferred embodiment of the invention, the execution of the program is monitored using a Client-Server architecture, with the debuggee (program) being the Client, and the logic to decide whether to log and what to log is implemented in the Server. The Client and Server are separate processes. The client and Server could be residing on the same system or on different systems. The debuggee (program) is coded to send unique tokens indicating different patterns and values. The Server processes these tokens and decides whether to log or not. The Server maintains information on known good patterns, acceptable ranges of values and acceptable states. When the debuggee sends tokens at run time, the Server checks the pattern, initial and final state and values against its database.

If the Server finds that the debuggee is not following a known pattern, and is not within the acceptable set of states, the pattern is logged, since it could be a potential cause for a bug. If the debuggee follows an unknown pattern, but reaches an acceptable state, the pattern is not logged, but rather recorded as another known good pattern. This reduces the false negatives while checking anomaly in pattern. Similarly, even though the values of variables might change with each run, as long as the value of a variable falls within the known range (known to the Server), it is not logged. This again reduces the false negatives while checking the value-based invariants. This algorithm detects anomaly in patterns (which could, for example, be startup/cleanup patterns) and value-based invariants, instead of checking just value based invariants.

Further benefits and advantages of this invention will become apparent from a consideration of the following detailed description, given with reference to the accompanying drawings, which specify and show preferred embodiments of the invention.

BRIEF DESCRIPTION OF THE DRAWINGS

FIGS. 3 and 4 give the server code for the preferred pseudo algorithm.

DETAILED DESCRIPTION OF THE PREFERRED EMBODIMENTS

The present invention, generally, provides a method, system and article of manufacture for detecting anomalies in a software program. The method comprises the steps of running the software program as a client; and the software program sending to a server a multitude of tokens at specified points in the program, each of the tokens having information about the software program. The server implements code to analyze said tokens and to compare information in the tokens to stored data to identify anomalies in the software program.

In a preferred embodiment, the tokens identify patterns of operation of the software programs, and the implementing step includes the step of the server comparing these program patterns with stored acceptable patterns to identify anomalous program patterns. This comparing may be done by the server logging, as potential anomalies, selected ones of the program patterns that do not match any of the stored acceptable patterns. The server also includes information identifying acceptable end states for the program patterns; and the server may log, as actual anomalies, any of the selected ones of the program patterns that reach an end state that is not one of the acceptable end states.

More specifically, in a preferred embodiment, the execution of the program is monitored using a Client-Server architecture, with the debuggee (program) being the Client, and the logic to decide whether to log and what to log is implemented in the Server. The Client and Server are separate processes. The client and Server could be residing on the same system or on different systems. The debuggee (program) is coded to send unique tokens indicating different patterns, and values. The Server processes these tokens and decides whether to log or not. The Server maintains information on known good patterns, acceptable ranges of values and acceptable states. When the debuggee sends tokens at run time, the Server checks the pattern, initial and final state and values against its database.

If the Server finds that the debuggee is not following a known pattern, and is not within the acceptable set of states, the pattern is logged, since it could be a potential cause for a bug. If the debuggee follows an unknown pattern, but reaches an acceptable state, the pattern is not logged, but rather recorded as another known good pattern. This reduces the false negatives while checking anomaly in pattern. Similarly, even though the values of variables might change with each run, as long as the value of a variable falls within the known range (known to the Server), it is not logged. This again reduces the false negatives while checking the value-based invariants. This algorithm detects anomaly in patterns (which could, for example, be startup/cleanup patterns) and value-based invariants, instead of checking just value based invariants.

The following guidelines may be adopted by a developer intending to debug problems using the present invention.

Rule 1: Use a Randomizer to generate a unique token (use file name, absolute file path, line number) for every trace point. Client sends these tokens to the server while tracing.

Rule 2: Programs will have to follow the Client server architecture, along with unique tokens for tracing. The program will not use any other mechanism like writing to a file/buffer.

Rule 3: The entire program has a unique token for the start of a pattern (S), and the end of a pattern (E).

Rule 4: The Server maintains a hashtable of tokens and other static information (entered by the user).

Each element of the hashtable has (i) a unique token sent by the code, (ii) a static value (string)—file name, line number etc., (iii) a token specific value (accepted values RANGE—For example, RANGE=Aa-Zz, for a textbox accepting characters, data race/Deadlock value), and (iv) a token type—Pattern (P), Data race (DR).

Rule 5: The Server maintains a database of Good/normal sequence of tokens (i.e., pattern string)—These could be created, for example, from regression tests or production runs. No event abstraction complexities like Event Based Behavior Abstraction.

Rule 6: To be able to obtain enough information from a problem run, the first time it occurs, the code should have a pattern type token added at places where the code reaches important phases, like connection established, connection not established, initialization complete, database initialized etc. Importantly, the code should have the pattern type tokens in the error state.

Rule 7: The Server maintains a set of accepted start and end states {StartState, EndState}.

Rule 8: The code needs to have traces for a start state, end state (error state is also an end state).

Figure 1:
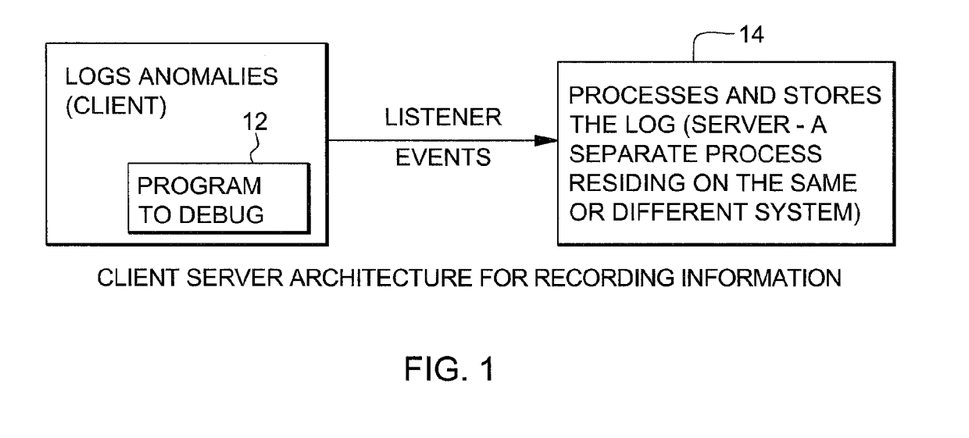
FIG. 1 illustrates a client server architecture for recording information in accordance with a preferred embodiment of the invention.

With reference to FIG. 1, in the implementation of the preferred embodiment of the invention, the Client 12, i.e., the Program that is to be debugged sends tokens as part of Listener events sent to the Server 14. The tokens carry very minimal information (e.g., Dynamic values). The Server 14 maintains a map for the token, which is comprised of static information that is to be recorded (e.g., Source File name). The server processes the received token and then decides whether to record or not, and constructs the information to be recorded. For example, in the case of cleanup/initialization process, the Server compares the received pattern with known patterns and records the received pattern only if it is a lesser-known pattern; in the case of values from external environment, the server records these values only if the value is out of range etc. If the server decides to record, it constructs the complete information (i.e., the dynamic values received from the token and other static information maintained).

Monitoring key problem areas and then recording the information only when a problem is suspected, ensures that the information is neither redundant nor lacking. The Client-Server architecture ensures that the performance of the program is not degraded.

Figure 2:
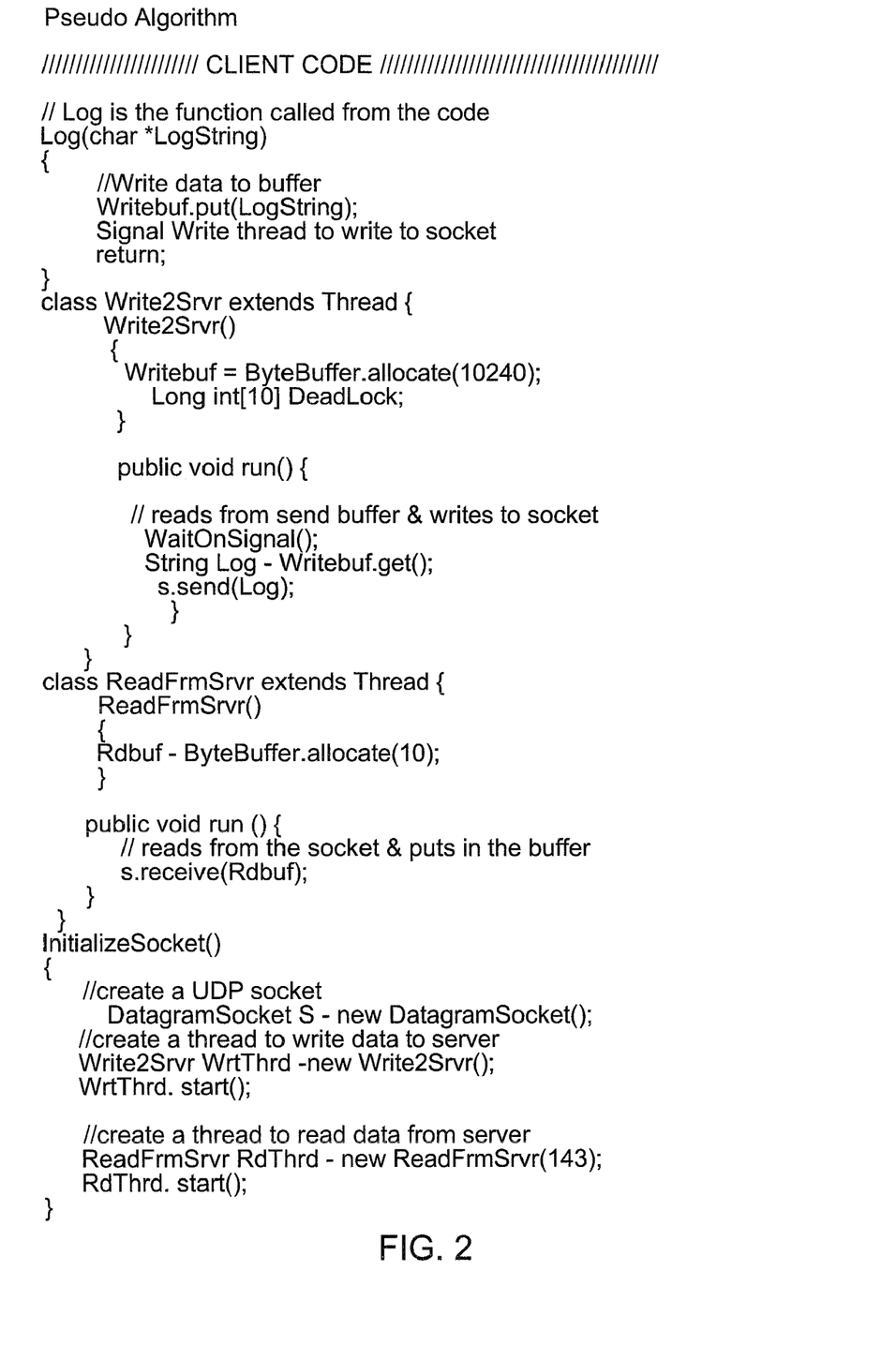
FIG. 2 gives the client code for the pseudo algorithm for a preferred embodiment of the invention.
Figure 4:
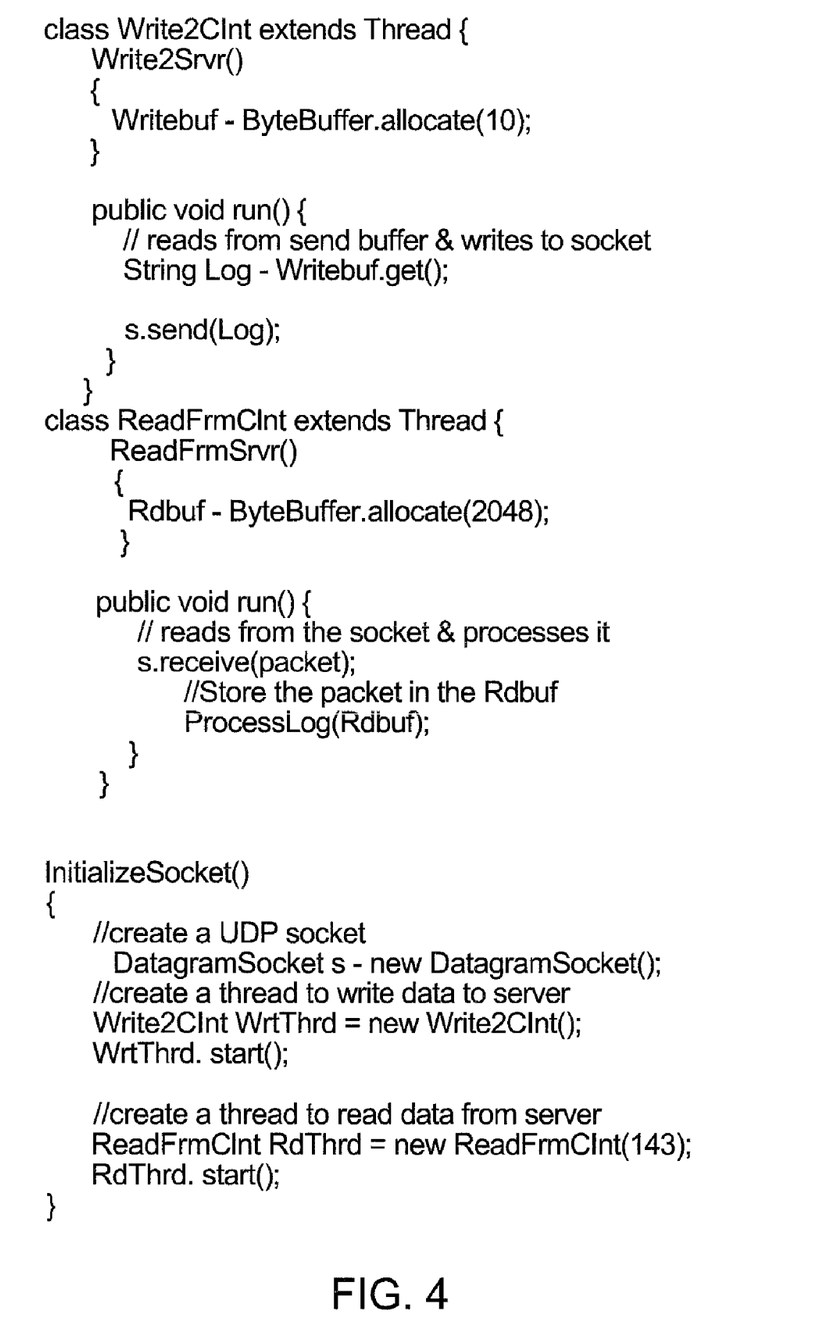

FIG. 2 gives the client code for the pseudo algorithm for the preferred embodiment, and FIGS. 3 and 4 give the server code for this pseudo algorithm.

In operation, the server performs a unique pattern recognition. In this pattern recognition, when a pattern start token (S) is received, subsequent P type tokens are concatenated in a string until pattern end token (E) is received. The concatenated string is matched against the stored pattern strings to check if it is a known pattern. If the received pattern is not found, and the start and end state is not present in the {StartState, EndState} set, the received pattern is recorded.

The server also determines if a received value is within a given data range. Specifically, if the received token type is IV, the server then checks the value sent by the program against a corresponding, specified data range, referred to as RANGE. If the received value is outside of RANGE, then the server records that received value.

Memory Requirement on Client

On the client side, memory is required for the buffer. This is a temporary buffer, and is typically within 10K. The other memory requirements are negligible.

Memory Requirements on Server

On the server, memory is required for the Hashtable for storing tokens and the list for storing patterns. Each element of the hashtable has a key (unique token sent by the code)-10 bytes; Static value (string)-100 bytes; Token specific value (valid range, data race set/reset bit)-2 bytes—in the case of patterns, the key itself is the token specific value; and Token type—1 byte. Thus, the memory required for each token is approximately 100 bytes. If 10 MB is assumed for the hashtable, approximately 10,000 tokens can be stored. List memory—Each unique token is 10 bytes. The memory required for the list is mi* Length of each pattern mi.

To give an indication on the growth of memory, for example, if a maximum of 200 methods is assumed for each pattern, it would require a maximum of 2K memory for each pattern. Around 250 patterns can be stored in 0.5 MB.

CPU Cycles on the Client

The Log( ) function is the one called by the code to log messages. This function writes data to the buffer. The data to be the written would be the unique token and dynamic data. Since this buffer needs to be locked, if there are "n" threads waiting to write to the buffer, the time taken to write this to the buffer would be O(1)+O(n). But considering that the data to be written is negligible (unique token and dynamic values), the delay due to O(n) is negligible, and hence the time taken by Logo is approximately O(1). Write2Srvr( ) is the function that would take maximum time. It calls s.send( ), which would take O(1), considering that only the unique token and dynamic data need to be processed. Hence the time taken by Write2Srvr( ) is also O(1). So, the overall time taken by the client code is O(1).

CPU Cycles on the Server

In ProcessLog( ) in the Server, MapTok( ) is the function that could potentially take a major portion of the time. This picks up the hash table element using the unique token received from the client. The Hash table needs to use perfect hashing mechanism. This will ensure that the worst-case time taken to pick up the element from the Hash table is O(1). The other function in ProcessLog( ) that could potentially take a major portion of the time is PatternMatch( ). This performs a string comparison with the patterns (concatenated string of unique strings) stored in a list. If there are "n" elements in the list, the worst-case time would be O(n). Once the element is picked up from the Hash table, the function ChkRange( ) will take a worst-case time of O(1), since it performs simple operations. So, the overall worst-case time taken by the Server code is O(n).

Figure 5:
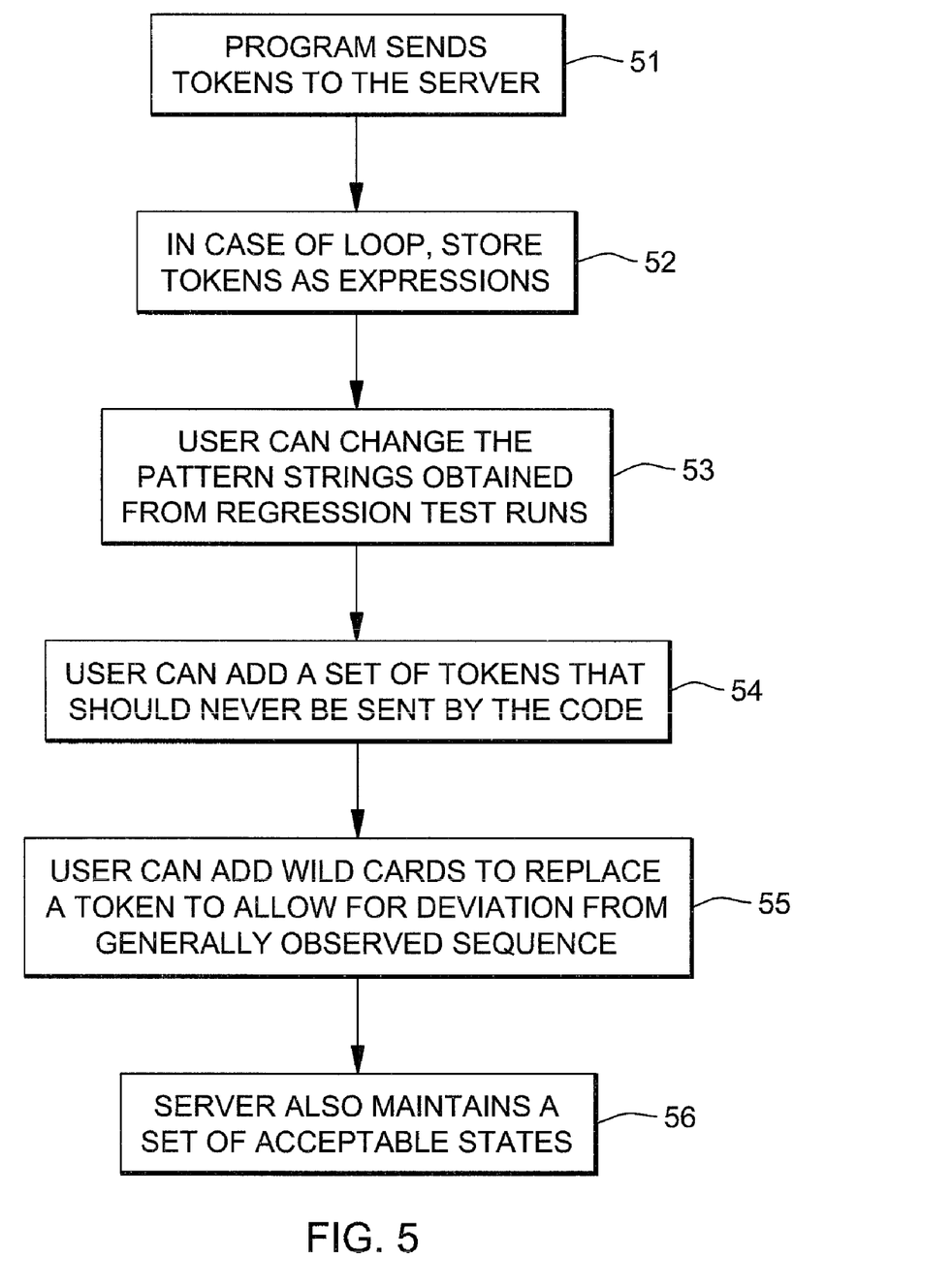
FIG. 5 shows a preferred procedure for obtaining patterns from regression tests.

The preferred technique for obtaining the pattern from regression test is detailed below. With reference to FIG. 5, at step 51, when the tests are run, the code naturally sends the unique tokens. These tokens are displayed to the user in the sequence that they were sent in the run. The user can mark and segregate this sequence into different patterns. For example, the user can group "Variable a initialized," "Variable b initialized," and "Initialize complete" as one single Server Initialize pattern. The Server then associates "Variable a initialized" as a start pattern token, and "Server Initialize complete" as an end pattern token. At step 52, in case there are loops, the tokens are stored as expressions. For example, a pattern where the server retries for connection 5 times is:

St<ServerInitialize>5*<ServerInitialize>Retry connection En<ServerInitialize>

At step 53, users can change the pattern string obtained from regression test runs. In the above example, if the user wants to allow for fifteen retries, the user modifies the pattern to St<ServerInitialize>15*<ServerInitialize>Retry connection En<ServerInitialize>. In the actual run of the code, an error will be logged only if the server retries for connection more than fifteen times. This reduces false positives. If the server were to use only what is observed in the regression test, it would log an error even if the server retried six times, which in fact is not an error as far as the user is concerned.

Another advantage of using patterns from regression tests is that we clearly have patterns which are known and good. In general pattern detection techniques, the system learns the patterns as and when they are run in the actual scenario. This does not guarantee that the observed pattern is a good pattern. For example, the code might have a bug the first time it is run. If the pattern learning mechanism does not use program understanding knowledge from regression test runs, it would identify this faulty pattern as a good pattern until the user manually marks it as a bad pattern. Using patterns from regression tests reduces false negatives.

At step 54, users can also add a set (called exclusion set) of token/sequence of tokens that should never be sent by the code. These would essentially be error conditions in the code. At step 55, in a certain pattern, i.e., sequence of tokens, if the user wants to allow for deviation from generally observed sequence, the user can replace the token/sequence of tokens with a "$". For example, if the pattern observed from a regression test is StartTokTok1Tok2Tok3EndTok, if the user feels, it is not mandatory that Tok3 is always received in a good pattern, and that even if the code sends a different token/sequence of tokens without violating the expected behavior of the code, the user can modify the good pattern expression to StartTokTok1Tok2$EndTok.

At step 56, in addition to these tokens, the Server also maintains a set of acceptable states. From the sequence of tokens received in the regression test runs, the user can mark some of them as Start State and End state. Error states should also be marked as end states by the user. The user also needs to choose acceptable pairs of states from all the pairs observed in the runs. The user can also add sets of acceptable states not observed in the regression test runs.

Use of these acceptable state pairs, pattern expressions and exclusion set reduces the false positives/negatives. For example, if the regression test runs record the pattern of Server start, Variable a initialized, Variable b initialized, Server Initialize Complete. If the user specifies a set of acceptable states as (Server Start, Server Initialize complete), and the user specifies the Server Initialize pattern as Server Start, Variable a initialized, variable b initialized, $, Server Initialize complete. Even if the run records a slightly different pattern say Server start, Variable a initialized, variable b initialized, packets sent, wait for packet, packet received, server initialize complete, this will not be reported as a failure, but will be reported as another known good pattern, since it satisfies the user it does not violate the acceptable state pairs, good pattern expression, nor does it have any token from the exclusion set. Thus, by making use of information captured from regression test, and user inputs, the amount of false positives and false negatives is reduced, while providing flexibility to learn new patterns.

Figure 6:
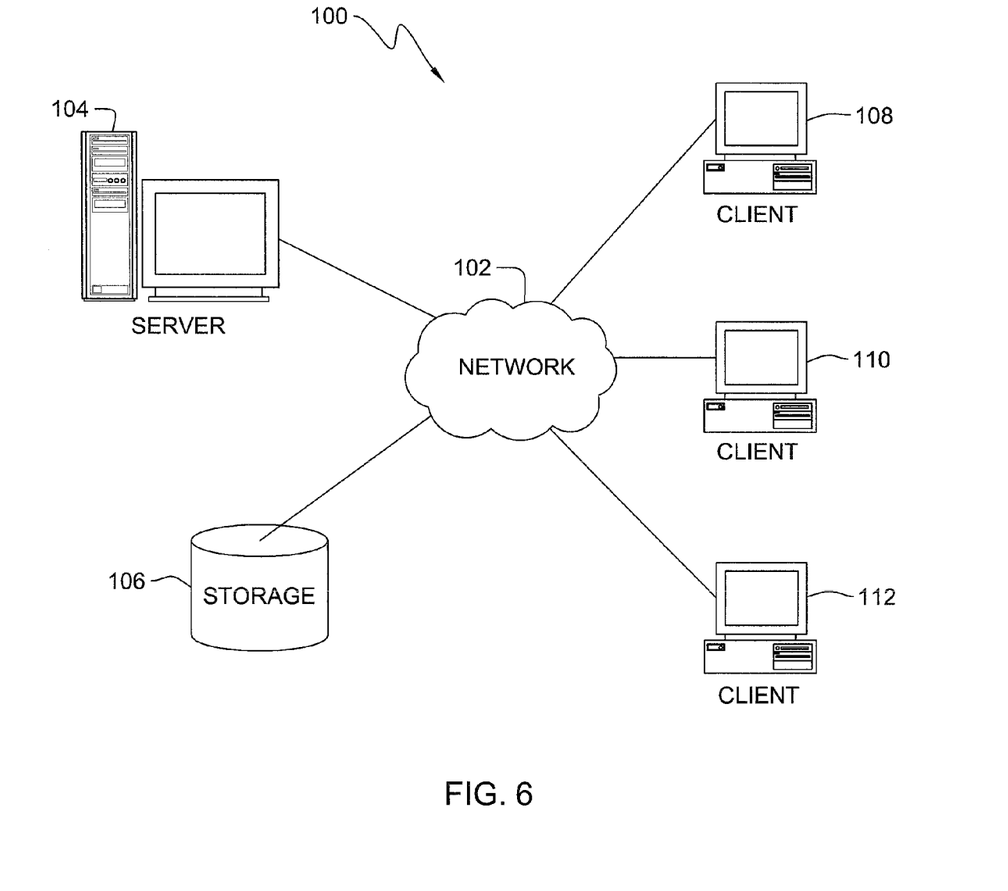
FIG. 6 is an exemplary diagram of a distributed data processing system in which the present invention may be implemented.

FIG. 6 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers.

In the depicted example, server 104 provides data, such as boot files, operating system images, and applications to clients 108-112. Clients 108, 110, and 112 are clients to server 104. Network data processing system 100 may include additional servers, clients, and other devices not shown.

Figure 7:
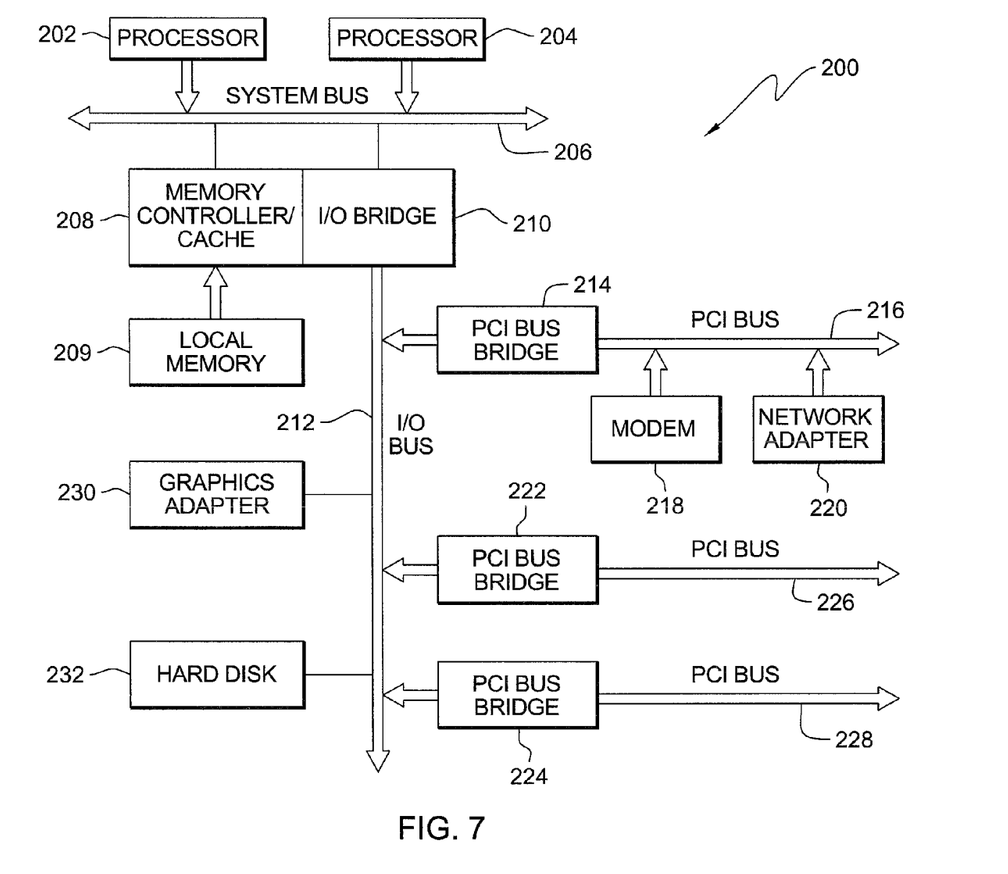
FIG. 7 is an exemplary diagram of a server-computing device that may be used as an LDAP server in accordance with the present invention.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 7 is intended as an example, and not as an architectural limitation for the present invention.

Referring to FIG. 7, a block diagram of a data processing system that may be implemented as a server, such as server 104 in FIG. 6, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 7 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 7 may vary. For example, other peripheral devices, such as optical disk drives and the like, also may be used in addition to or in place of the hardware depicted. The depicted example is not meant to imply architectural limitations with respect to the present invention.

Figure 8:
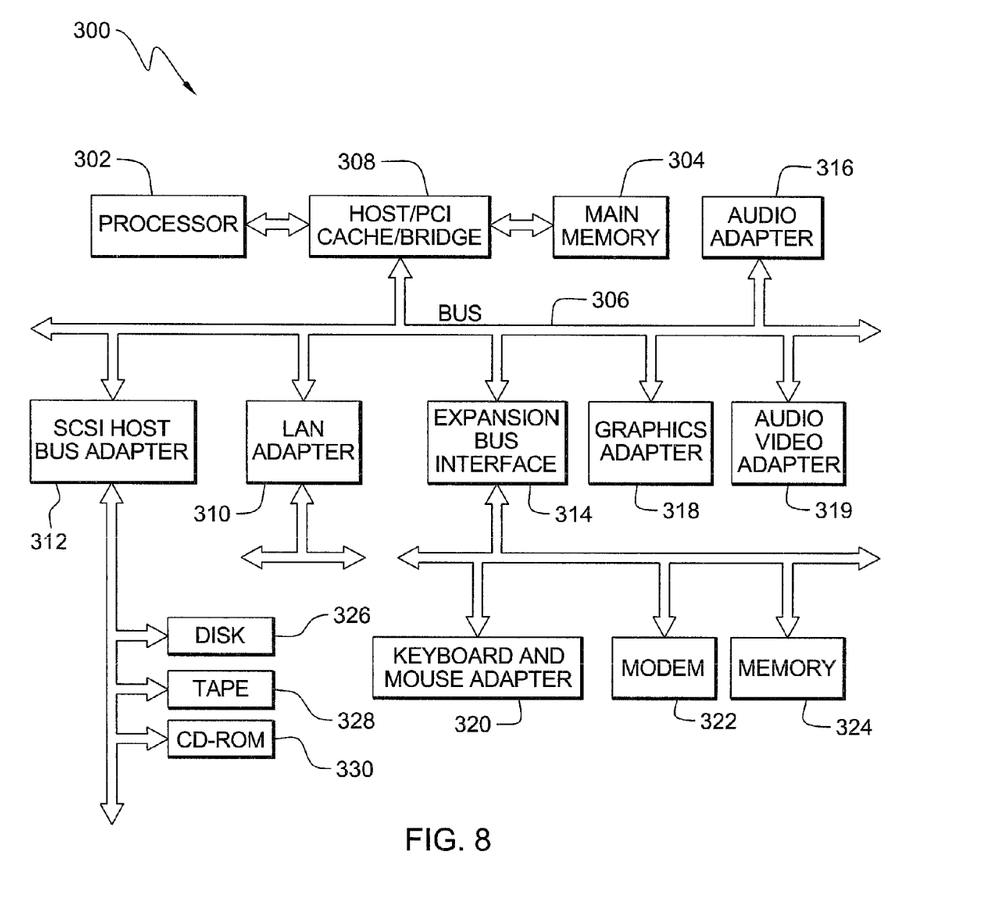
FIG. 8 is an exemplary diagram of a client device that may be used with an LDAP directory server in accordance with the present invention.

The data processing system depicted in FIG. 7 may be, for example, an IBM eServer pSeries system, a product of International Business Machines Corporation in Armonk, N.Y., running the Advanced Interactive Executive (AIX) operating system or LINUX operating system. With reference now to FIG. 8, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 8. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 8 may vary depending on the implementation. Other internal hardware or peripheral devices, such as flash read-only memory (ROM), equivalent nonvolatile memory, or optical disk drives and the like, may be used in addition to or in place of the hardware depicted in FIG. 8. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 8 and above-described examples are not meant to imply architectural limitations. For example, data processing system 300 also may be a notebook computer or hand held computer in addition to taking the form of a PDA. Data processing system 300 also may be a kiosk or a Web appliance.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of detecting anomalies in a software program, comprising the steps of:
    running the software program as a client;
    the software program sending to a server a multitude of tokens at specified points in the software program, each of the tokens having information about the software program; and
    the server receiving the tokens and implementing code to analyze said tokens and to compare information in the tokens to stored data to identify anomalies in the software program, including
    the server receiving a group of the multitude of tokens,
    concatenating the tokens of said group in a string pattern, and
    comparing the concatenated string pattern of tokens against a set of stored string patterns to determine if the concatenated string pattern of tokens matches any of said set of stored string patterns to determine if a potential anomaly has occurred in the software program.

2. The method according to claim 1, wherein the tokens identify program patterns of operation of the software program, and wherein the implementing step includes the step of the server comparing the program patterns identified by the tokens with stored acceptable patterns to identify anomalous program patterns.

3. The method according to claim 2, wherein the comparing step includes the step of the server logging, as potential anomalies, selected ones of the program patterns that do not match any of the stored acceptable patterns.

4. The method according to claim 3, wherein each of the program patterns reaches an associated end state, and the server includes information identifying acceptable end states, and wherein the comparing step includes the further step of logging, as anomalies, any of the selected ones of the program patterns that reach an end state that is not one of the acceptable end states.

5. The method according to claim 4, wherein the implementing step includes the step of, for each of the program patterns that does not match any of the stored acceptable patterns but which has an acceptable end state, recording said each of the program patterns as one of the stored acceptable patterns.

6. The method according to claim 1, wherein each of the tokens identifies a specified value, and the implementing step includes the steps of the server determining whether the specified values identified by the tokens are within associated ranges.

7. The method according to claim 6, wherein the implementing step includes the step of logging as an anomaly, any of the specified values identified by the tokens that does not fall within the associated range.

8. The method according to claim 1, wherein the sending step includes the step of the software program sending to the server a pattern start token, subsequent P type tokens, and a pattern end token.

9. The method according to claim 8, wherein the implementing step includes the step of the server concatenating said P type tokens in a string, and comparing the concatenated string against stored pattern strings to check if said concatenated string pattern is a known pattern.

10. The method according to claim 1, wherein said tokens include a multitude of unique tokens, and the software program has a respective one of said unique tokens at each of a multitude of specified point in the program.

11. The method according to claim 1, wherein said tokens include a multitude of unique tokens, and the software program has a respective one of said unique tokens at each of a multitude of specified points in the software program; and the server maintains an exclusion set; and when a pattern of the software program reaches a state in the exclusion set, the pattern is recorded as a potential error.

12. A system for detecting anomalies in a software program, the system comprising:
    at least one client hardware processing unit; and
    at least one server hardware processing unit;
    the client hardware processing unit being configured for running the software program as a client;
    the software program sending to the server hardware processing unit a multitude of tokens at specified points in the software program, each of the tokens having information about the software program; and
    the server hardware processing unit being configured for receiving the tokens and implementing code to analyze said tokens and to compare information in the tokens to stored data to identify anomalies in the software program, including
    the server hardware processing unit receiving a group of the multitude of tokens,
    concatenating the tokens of said group in a string pattern, and
    comparing the concatenated string pattern of tokens against a set of stored string patterns to determine if the concatenated string pattern of tokens matches any of said set of stored string patterns to determine if a potential anomaly has occurred in the software program.

13. The system according to claim 12, wherein the tokens identify program patterns of operation of the software program, and wherein the at least one server hardware processing unit is configured for performing said implementing by comparing the program patterns identified by the tokens with stored acceptable patterns to identify potentially anomalous program patterns.

14. The system according to claim 13, wherein each of the program patterns reaches an associated end state, and the server hardware processing unit includes information identifying acceptable end states, and wherein the at least one server hardware processing unit is configured for logging, as anomalies, any of the potentially anomalous program patterns that reach an end state that is not one of the acceptable end states.

15. The system according to claim 12, wherein each of the tokens identifies a specified value, and the at least one server hardware processing unit is configured for determining whether the specified values identified by the tokens are within associated ranges.

16. The system according to claim 12, wherein the at least one server hardware processing unit is configured for causing the software program to send to the server hardware processing unit a pattern start token, subsequent P type tokens, and a pattern end token; and for causing the server hardware processing unit to concatenate said P type tokens in a string, and to compare the concatenated string against stored pattern strings to check if said concatenated string pattern is a known pattern.

17. An article of manufacture comprising:
    at least one non-transitory computer usable device having computer readable program code logic tangibly embodied therein to execute a machine instruction in a processing unit for detecting anomalies in a software program, said computer readable program code logic, when executing, performing the following steps:
    running the software program as a client;
    the software program sending to a server a multitude of tokens at specified points in the software program, each of the tokens having information about the software program; and
    the server receiving the tokens and implementing code to analyze said tokens and to compare information in the tokens to stored data to identify anomalies in the software program, including
    the server receiving a group of the multitude of tokens,
    concatenating the tokens of said group in a string pattern, and
    comparing the concatenated string pattern of tokens against a set of stored string patterns to determine if the concatenated string pattern of tokens matches any of said set of stored string patterns to determine if a potential anomaly has occurred in the software program.

18. The article of manufacture according to claim 17, wherein the tokens identify program patterns of operation of the software programs, and wherein the implementing step includes the step of the server comparing the program patterns identified by the tokens with stored acceptable patterns to identify anomalous program patterns.

19. The article of manufacture according to claim 18, wherein the comparing step includes the step of the server logging, as potential anomalies, selected ones of the program patterns that do not match any of the stored acceptable patterns.

20. The article of manufacture according to claim 17, wherein each of the tokens identifies a specified value, and the implementing step includes the steps of the server determining whether the specified values identified by the tokens are within associated ranges.

* * * * *